United States Patent [19]

Ota

[11] Patent Number: 4,608,611
[45] Date of Patent: Aug. 26, 1986

[54] COLOR VIDEO SIGNAL RECORDING AND/OR REPRODUCING SYSTEM USING OVERLAP RECORDING OF FM LUMINANCE SIGNAL OVER FREQUENCY CONVERTED CARRIER CHROMINANCE SIGNAL

[75] Inventor: Yoshihiko Ota, Yokohama, Japan

[73] Assignee: Victor Company of Japan, Japan

[21] Appl. No.: 547,105

[22] Filed: Oct. 31, 1983

[30] Foreign Application Priority Data

Nov. 2, 1982 [JP] Japan .................................. 57-192955

[51] Int. Cl.[4] .............................................. H04N 9/80
[52] U.S. Cl. ..................................... 358/328; 358/330
[58] Field of Search ............... 358/310, 327, 328, 330, 358/334

[56] References Cited

U.S. PATENT DOCUMENTS

| | | | |
|---|---|---|---|
| 3,911,483 | 10/1975 | Kihara et al. | 358/330 |
| 4,296,430 | 10/1981 | Warren | 358/328 |
| 4,399,472 | 8/1983 | Yamamoto et al. | 358/330 |
| 4,425,585 | 1/1984 | Sekimoto et al. | 358/328 |
| 4,491,876 | 1/1985 | Aoike et al. | 358/330 |

FOREIGN PATENT DOCUMENTS

| | | |
|---|---|---|
| 1562192 | 1/1971 | Fed. Rep. of Germany . |
| 2048559 | 7/1972 | Fed. Rep. of Germany . |
| 1935109 | 7/1980 | Fed. Rep. of Germany . |
| 1275307 | 5/1972 | United Kingdom . |

Primary Examiner—Donald McElheny, Jr.
Attorney, Agent, or Firm—Andrus, Sceales, Starke & Sawall

[57] ABSTRACT

A color video signal recording and reproducing system includes a recording system which comprises first head gaps mounted on a rotary body, second head gaps mounted on the rotary body at locations lagging each of the first head gaps by a predetermined distance along a rotating direction of the rotary body, and a recorder for recording signals onto a tape which is caused to travel in a state where the tape is wrapped around a peripheral surface of the rotary body. The recorder first records a low-band converted carrier chrominance signal onto a first track by one of the first head gaps, and thereafter records a frequency modulated luminance signal onto a second track by one of the second head gaps. The second track has a track width which is larger than a track width of the first track and is formed over the first track in an overlapping manner with a track pitch which is at least larger than the track width of the first track. A reproducing system comprises a circuit for separating the low-band converted carrier chrominance signal from a signal which is reproduced from the tape by the first or second head gaps, and a circuit for separating the frequency modulated luminance signal from a signal which is reproduced from the tape by the second head gaps.

6 Claims, 15 Drawing Figures

COLOR VIDEO SIGNAL RECORDING AND/OR REPRODUCING SYSTEM USING OVERLAP RECORDING OF FM LUMINANCE SIGNAL OVER FREQUENCY CONVERTED CARRIER CHROMINANCE SIGNAL

BACKGROUND OF THE INVENTION

The present invention generally relates to color video signal recording systems and color video signal recording and reproducing systems, and more particularly to a system for recording and reproducing a color video signal so that a high-quality reproduced picture can be obtained upon reproduction, even in a system which records the color video signal in a manner such that recorded positions of horizontal synchronizing signals in the color video signal are not aligned in mutually adjacent tracks which are formed on a recording medium in contiguous contact without a guard band between the mutually adjacent tracks.

Generally, in the recording system of a SECAM system color video signal recording and/or reproducing system, for example, a SECAM system color video signal is supplied to a lowpass filter and a bandpass filter, and a luminance signal is separated and filtered in the lowpass filter while a carrier chrominance signal is separated and filtered in the bandpass filter. As is well known, the above carrier chrominance signal is a signal in which a first frequency modulated signal which is obtained by frequency-modulating a first chrominance subcarrier by a color difference signal B−Y, and a second frequency modulated signal which is obtained by frequency-modulating a second chrominance subcarrier by a color difference signal R−Y, are time-sequentially multiplexed in an alternate manner for every one horizontal scanning period (1H). The above carrier chrominance signal having a carrier frequency of 3.9 MHz to 4.75 MHz, for example, is supplied to a frequency dividing circuit wherein the carrier chrominance signal is frequency-divided and converted into a low frequency range. Moreover, the carrier frequency of the carrier chrominance signal is set to a frequency in a range of 0.97 MHz to 1.19 MHz, for example, and the frequency deviation width is reduced. The carrier chrominance signal which is frequency-converted into the low frequency range and the frequency modulated luminance signal, are subjected to a frequency-division-multiplexing and then amplified to be formed into a composite color video signal. This composite color video signal is supplied to a pair of rotary heads having gaps of mutually different azimuth angles.

On the other hand, in the reproducing system, the pair of rotary heads alternately reproduce the composite color video signal which is recorded on the magnetic recording medium (magnetic tape). The outputs of the pair of rotary heads are respectively amplified, and are formed into a continuous signal by being switched alternately in a switching circuit. The frequency modulated luminance signal in this continuous signal, is separated and filtered in a highpass filter, and is then demodulated and converted into the luminance signal in a demodulating circuit. The frequency converted carrier chrominance signal in the continuous signal, is separated and filtered in a lowpass filter, and is then supplied to a multiplying circuit wherein the carrier frequency is restored into the original carrier frequency. The output of this multiplying circuit is supplied to a bandpass filter so as to obtain a predetermined frequency band. The reproduced carrier chrominance signal and the reproduced luminance signal from the demodulating circuit, are multiplexed and formed into a reproduced SECAM system color video signal in a multiplexing circuit.

As one example of a track pattern formed on the magnetic tape according to the above described recording and/or reproducing system, there is a track pattern in which mutually adjacent tracks are formed on the magnetic tape without a guard band formed between the adjacent tracks, by use of a pair of rotary heads having gaps of mutually different azimuth angles. According to this type of a track pattern, crosstalk components from the adjacent tracks are included within the reproduced signal when one rotary head scans over one track. Upon reproduction, there is essentially no crosstalk component related to the luminance signal which is frequency-modulated upon recording, because the azimuth loss is large with respect to the high-frequency luminance signal. On the other hand, the crosstalk component related to the carrier chrominance signal which is frequency-converted into the low frequency range upon recording, is reproduced because the azimuth loss is relatively small with respect to the low-frequency chrominance signal.

Generally, the recording is carried out so that the positions where the horizontal synchronizing signals are recorded, are aligned in a direction perpendicular to the longitudinal direction of the track (so-called H-alignment). Moreover, the recording is carried out so that substantially the same modulated signal components in the frequency converted carrier chrominance signal are adjacent to each other. As a result, the frequency of the frequency converted carrier chrominance signal which is reproduced from one track and the frequency converted carrier chrominance signals which are reproduced from tracks which are adjacent to this one track become substantially the same, because there is correlation among the color video signal components in every one field interval, and because the recording is carried out so that substantially the same modulated signal components are adjacent to each other. Therefore, the frequency difference between the frequency converted carrier chrominance signal which is reproduced from the one track and the frequency converted carrier chrominance signal which is reproduced from the track which is adjacent to the one track is substantially zero, and no beat is introduced. Accordingly, there is virtually no effect of crosstalk among the mutually adjacent tracks with respect to the frequency converted carrier chrominance signal.

It is sometimes desirable to carry out recording and/or reproduction of a long duration. When carrying out such a long-duration recording and/or reproduction in a magnetic recording and/or reproducing apparatus which forms the track pattern described heretofore, only the tape traveling speed is reduced. That is, the diameter of the drum which carries the rotary heads, the tape width, the rotational speed of the drum, and the number of horizontal scanning lines all remain unchanged. When carrying out four hours of recording and/or reproduction by use of a magnetic tape which is designed for two hours of recording and/or reproduction, for example, only the tape traveling speed is reduced to ½ the tape traveling speed which would otherwise be used for two hours of recording and/or reproduction with such a magnetic tape. In the track pattern obtained when four hours of recording and/or reproduction is carried out by use of the magnetic tape which is designed for two hours of recording and/or reproduction, the positions where the horizontal synchronizing signals are recorded are not in alignment in the mutually adjacent tracks (that is, not in H-alignment). Accordingly, no correlation exists between the adjacent tracks, and the carrier frequencies of the carrier chrominance signal in the low frequency range differ in the adjacent tracks. In this case, because the adjacent tracks are recorded by the rotary heads having gaps of mutually different azimuth angles, the azimuth loss of the frequency modulated luminance signal becomes large in the high frequency range. As a result, with respect to the frequency modulated luminance signal, there is little effect of crosstalk from the adjacent tracks. However, the azimuth loss of the recorded carrier chrominance signal is small because the recorded carrier chrominance signal is in the low frequency range. The effect of crosstalk from the adjacent tracks is large with respect to the carrier chrominance signal, since the carrier frequencies of the recorded carrier chrominance signal differ in the adjacent tracks. Thus, beat interference is introduced.

On the other hand, if a guard band is formed between the adjacent tracks so as to eliminate the crosstalk, the track width of the heads must be reduced in order to provide the same recording and reproducing time as a recording and reproducing apparatus employing the azimuth recording and reproducing system, with respect to the same length of magnetic tape. However, if the track width of the heads is reduced, the signal-to-noise (S/N) ratio of the reproduced signal becomes deteriorated compared to the S/N ratio of the reproduced signal obtained in a recording and reproducing apparatus which does not form such a guard band between the adjacent tracks. On the other hand, if an attempt is made to maintain the same S/N ratio as the S/N ratio obtained in the recording and reproducing apparatus which does not form the guard band, the recording density on the magnetic tape becomes low and the recording and reproducing time becomes shortened. In addition, if the guard band is formed between the adjacent tracks, there is a problem in that noise bar is generated in the reproduced picture during special reproduction modes of the recording and reproducing apparatus.

Further, an NTSC system color video signal may be recorded and reproduced without forming a guard band between the adjacent tracks, as disclosed in a U.S. Pat. No. 4,178,606 of which the assignee is the same as the assignee of the present application. However, as disclosed in this U.S. patent, measures must be taken to eliminate the effects of crosstalk (as in the case of the recording and reproduction of a PAL system color video signal). Such measures include recording the carrier chrominance signal which is frequency-converted in the low frequency range onto one of the adjacent tracks so that the phase of the frequency converted carrier chrominance signal is shifted in a specific direction by 90° for every one horizontal scanning period, and recording the frequency converted carrier chrominance signal onto the other of the adjacent tracks so that the phase of the frequency converted carrier chrominance signal is shifted in a direction opposite to the above specific direction by 90° for every one horizontal scanning period. Accordingly, when recording and reproducing the NTSC system color video signal, it was necessary to provide phase shifting means for performing the above phase shift, in both the recording system and the reproducing system. Therefore, there were disadvantages in that the circuit construction became complex and the cost of the system as a whole became high.

SUMMARY OF THE INVENTION

Accordingly, it is a general object of the present invention to provide a novel and useful color video signal recording system and color video signal recording and reproducing system, in which the above described disadvantages have been overcome.

Another and more specific object of the present invention is to provide a color video signal recording system which is applicable to a system which separates a luminance signal and a carrier chrominance signal from a standard system color video signal, frequency-modulates the separated luminance signal, frequency-converts the separated carrier chrominance signal to a frequency range which is lower than the band of the frequency modulated luminance signal, frequency-division-multiplexes the frequency modulated luminance signal and the frequency converted carrier chrominance signal, and records the frequency-division-multiplexed signal onto a magnetic recording medium. The recording system according to the present invention records the frequency converted carrier chrominance signal on a first track which has a first track width by a first head gap, and then, after a predetermined time lag, records the frequency modulated luminance signal by a second head gap having a second track width which is wider than the first track width over the full width of the first track in an overlapping manner. According to the recording system of the present invention, the frequency converted carrier chrominance signal and the frequency modulated luminance signal are respectively multiplexed and recorded on successive tracks with a track pitch which is greater than the first track width.

Still another object of the present invention is to provide a color video signal recording and reproducing system which is applicable to a system which separates a luminance signal and a carrier chrominance signal from a standard system color video signal, frequency-modulates the separated luminance signal, frequency-converts the separated carrier chrominance signal to a frequency range which is lower than the band of the frequency modulated luminance signal, frequency-division-frequency multiplexes the frequency modulated luminance signal and the frequency converted carrier chrominance signal, records the frequency-division-multiplexed signal onto a magnetic recording medium, and reproduces the recorded frequency-division-multiplexed signal from the magnetic recording medium. Upon recording, the recording and reproducing system according to the present invention records the frequency converted carrier chrominance signal on a first track which has a first track width by a first head gap, and then, after a predetermined time lag, records the frequency modulated luminance signal by a second head gap having a second track width which is wider than the first track width over the full width of the first track in an overlapping manner. The frequency converted carrier chrominance signal and the frequency modulated luminance signal are respectively multiplexed and recorded on successive tracks with a track pitch which is greater than the first track width. Upon reproduction, the recording and reproducing system of the present invention separates the frequency converted carrier chrominance signal from a signal which is reproduced from said magnetic recording medium by the first or second head gap, and restores the separated frequency converted carrier chrominance signal into a standard system reproduced carrier chrominance signal. On the other hand, the frequency modulated luminance signal which is separated from a signal which is reproduced from the magnetic recording medium by the second head gap, is subjected to frequency demodulation and restored into a reproduced luminance signal. The reproduced carrier chrominance signal and the reproduced luminance signal are multiplexed, to obtain a reproduced color video signal. According to the recording and reproducing system of the present invention, the track which has the narrow track width and is recorded with the frequency converted carrier chrominance signal, is formed within the track which is recorded with the frequency modulated luminance signal. Thus, a guard band is in essence formed between the adjacent tracks which are recorded with the frequency converted carrier chrominance signal. Accordingly, the reproduced frequency converted carrier chrominance signal does not include as crosstalk the frequency converted carrier chrominance signal which is recorded on the adjacent tracks. On the other hand, the frequency converted carrier chrominance signal recorded on the adjacent tracks may be included as crosstalk in the reproduced frequency modulated luminance signal, however, such crosstalk can be eliminated in a filter which separates the frequency modulated luminance signal. Hence, it is possible to eliminate the undesirable effects the crosstalk from the adjacent tracks have on the reproduced picture, even when reproducing signals from a recording medium which has a track pattern in which there is no guard band between the adjacent tracks which are recorded with the frequency modulated luminance signal and the recording positions of the horizontal synchronizing signals are not aligned in the adjacent tracks (not in H-alignment). There is no need to reduce the track width because there is no need to form a guard band, and for this reason, the S/N ratio of the reproduced signal can be maintained to a desired S/N ratio. Further, it is possible to carry out a special reproduction with respect to the recording medium which has the track pattern in which there is no H-alignment, by performing processing such as the so-called skew-jump processing which makes the interval of the horizontal synchronizing signals constant.

A further object of the present invention is to provide a color video signal recording system which records the frequency converted carrier chrominance signal at a most suitable recording level, with a time difference between the recording of the frequency modulated luminance signal. According to the recording system of the present invention, the frequency converted carrier chrominance signal can be reproduced with a satisfactory S/N ratio, even if the track width of the track which is recorded with the frequency converted carrier chrominance signal is extremely narrow.

Another object of the present invention is to provide a color video signal recording and reproducing system which employs two head assemblies which are mounted diametrically on a rotary body. Each head assembly is made up from two head gaps with the same azimuth angle, among a first pair of head gaps and a second pair of head gaps. The first pair of head gaps have mutually different azimuth angles, and the second pair of head gaps respectively have the same azimuth angles as the first pair of head gaps. According to the recording and reproducing system of the present invention, a SECAM system color video signal is recorded so that it is possible to achieve magnetic tape compatibility between the system according to the present invention and the system employed in the existing helical scan type video tape recorder which is in conformance with the SECAM system standard. Such magnetic tape compatibility can be achieved by selecting the azimuth angles of the two head gaps in each of the head assemblies, to azimuth angles which are the same as the azimuth angles of the pair of rotary heads employed in the existing video tape recorder.

Other objects and further features of the present invention will be apparent from the following detailed description when read in conjunction with the accompanying drawings.

DETAILED DESCRIPTION

Figure 1:
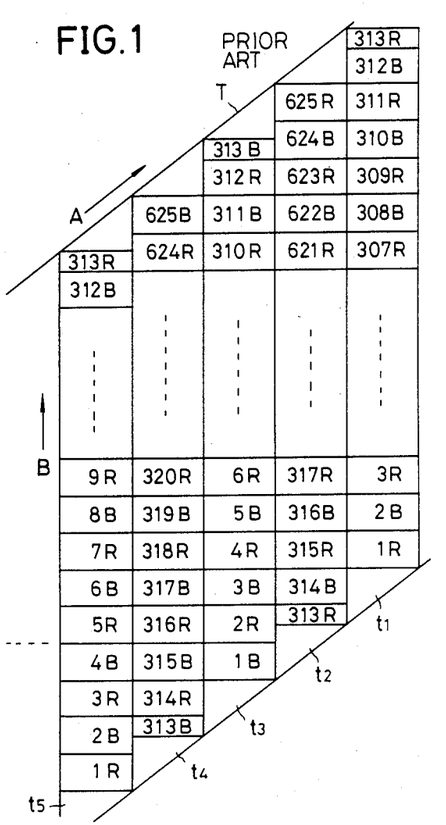
FIG. 1 shows a track pattern which indicates recorded positions of a SECAM system color video signal when carrying out a normal recording or reproduction.

A magnetic tape T onto which and from which a signal is recorded and reproduced by a general recording and reproducing system, has a track pattern shown in FIG. 1, for example. This track pattern is formed by magnetic heads having gaps of mutually different azimuth angles, so that mutually adjacent tracks on the tape T are formed by the magnetic heads having gaps of mutually different azimuth angles, without forming a guard band between the adjacent tracks. In FIG. 1, a first track t1 comprises intervals 1R, 2B, 3R, ..., 312B, and 313R, a second track t2 comprises intervals 313R, 314B, ..., 624B, and 625R, etc. Among the tracks shown in FIG. 1, the interval 1R represents an interval wherein a carrier chrominance signal obtained by frequency-modulating a chrominance subcarrier by a color difference signal R−Y in the first 1H (H indicates one horizontal scanning period) is recorded, the interval 2B represents an interval wherein a carrier chrominance signal obtained by frequency-modulating a chrominance subcarrier by a color difference signal B−Y in a subsequent 1H is recorded, the interval 3R represents an interval wherein a carrier chrominance signal obtained by frequency-modulating a chrominance subcarrier by a color difference signal R−Y in a third 1H is recorded, etc. In the representation of the intervals by a combination of a number and a character, the number indicates the number of the horizontal scanning line in one frame, the character R indicates that the modulating signal component of the carrier chrominance signal is the color difference signal R−Y, and the character B indicates that the modulating signal component of the carrier chrominance signal is the color difference signal B−Y.

In the case of the tape pattern shown in FIG. 1, the positions where the horizontal synchronizing signals are recorded in the adjacent tracks, are arranged in alignment along a direction perpendicular to the longitudinal direction of the track. That is, there is the so-called H-alignment. For example, with respect to the interval 1R in the track t1, the interval 315R in the track t2 is adjacent to the interval 1R in the adjacent track t1, and the interval 4R in the track t3 is adjacent to the interval 315 in the adjacent track t2. Thus, the modulating signal components of the carrier chrominance signals which are frequency converted in the low frequency range and recorded in these intervals 1R, 315R, and 4R, are the same. For this reason, the effect of crosstalk from the adjacent tracks with respect to the frequency converted carrier chrominance signal is small. Generally, there is correlation between signal components of one field intervals of the color video signal. For example, between the interval 1R and the interval 315R, the carrier chrominance signals recorded in these intervals are both frequency converted carrier chrominance signal having the color difference signal R−Y as the modulating signal, and the frequencies are substantially the same in these intervals. Hence, the crosstalk between the frequency converted carrier chrominance signals in the adjacent tracks is substantially zero, and there is hardly any effect on the demodulated color signal.

Figure 2:
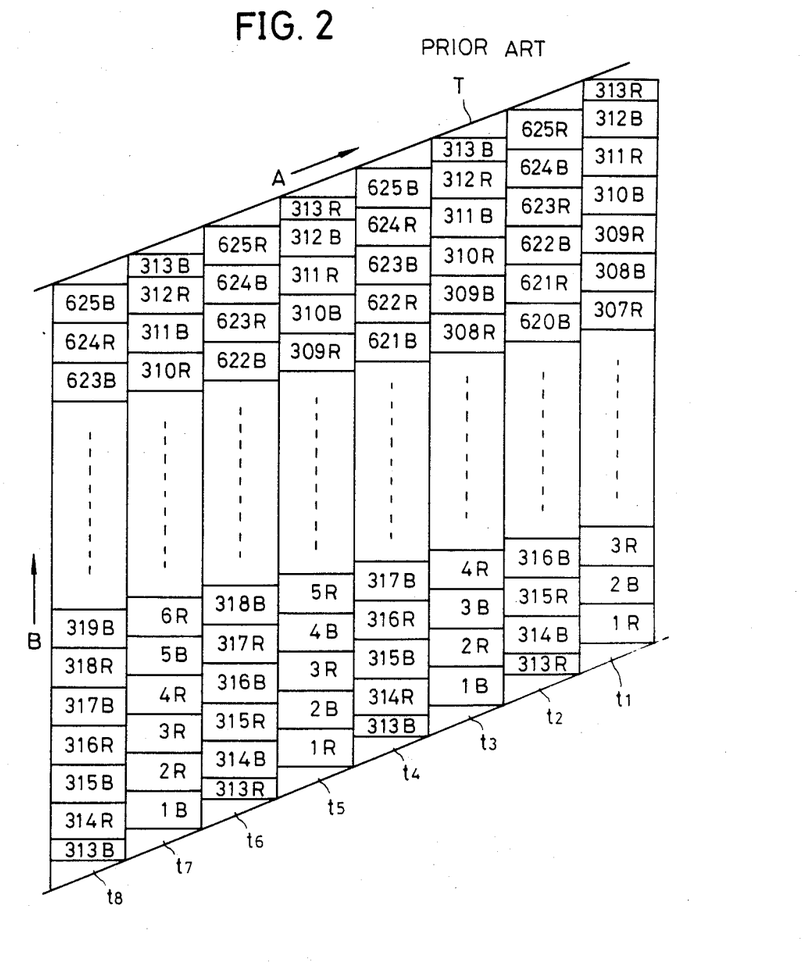
FIG. 2 shows a track pattern which indicates recorded positions of a SECAM system color video signal when carrying out a recording or reproduction by reducing the tape traveling speed to ½ the tape traveling speed upon normal recording or reproduction.

A long-duration recording and/or reproduction is sometimes carried out by the magnetic recording and/or reproducing apparatus which forms the track pattern shown in FIG. 1 during a normal recording mode. For example, when carrying out four hours of recording and/or reproduction by use of a magnetic tape designed for two hours of recording and/or reproduction, the diameter of the drum, the tape width, the rotational speed of the drum, and the number of horizontal scanning lines remain unchanged, and only the tape traveling speed is reduced to ½ the tape traveling speed which would otherwise be used for two hours of recording and/or reproduction with such a magnetic tape. The track pattern obtained when the tape traveling speed is reduced to ½ in this manner, is shown in FIG. 2. In the track pattern shown in FIG. 2, the positions where the horizontal synchronizing signals are recorded are not in alignment in the adjacent tracks, that is, there is no H-alignment. Accordingly, there is no correlation between the adjacent tracks, and the carrier frequencies of the frequency converted carrier chrominance signals differ in the adjacent tracks. In this case, because mutually adjacent tracks are recorded with magnetic heads which have gaps of mutually different azimuth angles, the azimuth loss is large with respect to the frequency modulated luminance signal in the high frequency range, and the effect of crosstalk from the adjacent tracks is extremely small for the frequency modulated luminance signal. However, because the recorded carrier chrominance signal is in the low frequency range, the azimuth loss is small with respect to the carrier chrominance signal. In addition, because the carrier frequencies of the recorded carrier chrominance signals differ in the mutually adjacent tracks, the effect of crosstalk from the adjacent tracks is large for the carrier chrominance signal, and beat interference is introduced.

The present invention has eliminated the problems of the system described heretofore. First, description will be given with respect to an embodiment of a recording system of the recording and reproducing system according to the present invention, by referring to FIG. 3. A SECAM system color video signal which is applied to an input terminal 11, is supplied to a lowpass filter 12 and a bandpass filter 13. The luminance signal which is separated in the lowpass filter 12, is supplied to a frequency modulator 14 wherein a carrier is frequency modulated. An output frequency modulated wave of the frequency modulator 14 is supplied to a highpass filter 15 wherein an unwanted component is eliminated. An output of the highpass filter 15 is supplied to a second pair of head gaps $GY_1$ and $GY_2$ which will be described later on in the specification.

Figure 3:
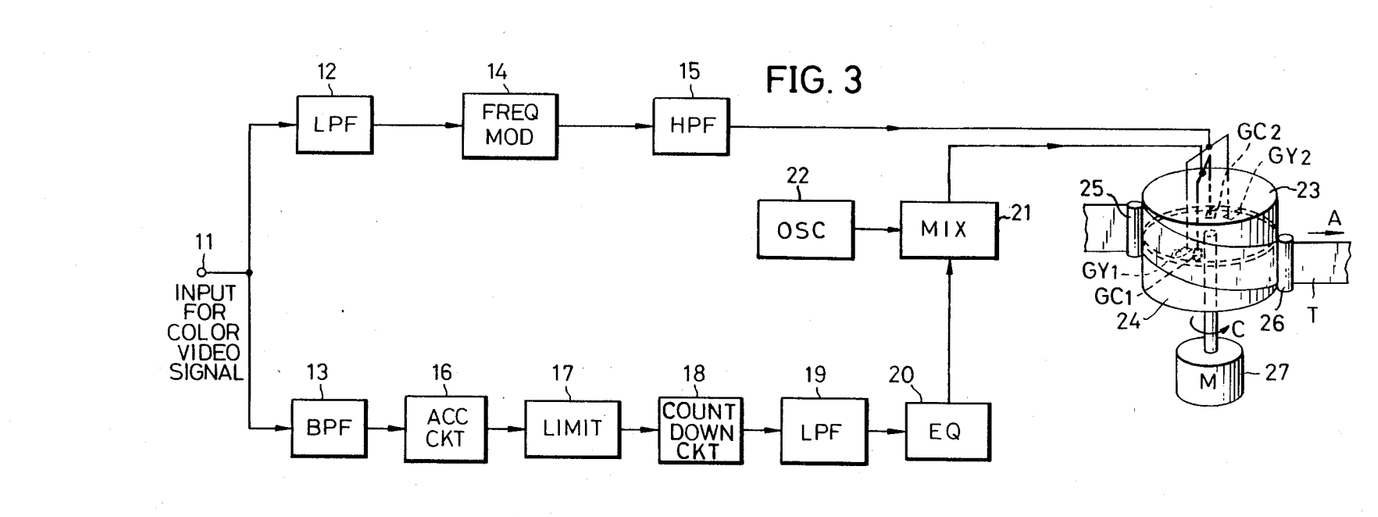
FIG. 3 is a systematic block diagram showing an embodiment of a recording system of a color video signal recording and reproducing system according to the present invention.
Figure 5A:
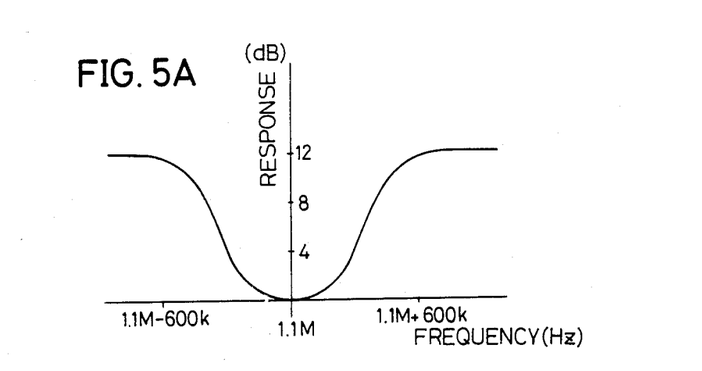
FIGS. 5A and 5B respectively show frequency characteristics of an equalizer circuit which is employed in a recording system and a reproducing system of the recording and reproducing system according to the present invention.

The carrier chrominance signal which is separated in the bandpass filter 13, is supplied to an automatic chroma control (ACC) circuit 16. As is well known, this carrier chrominance signal is a line-sequential signal in which a carrier of approximately 4.4 MHz is alternately frequency modulated by a (B−Y) signal or an (R−Y) signal, for every one horizontal scanning period (1H). The level of the carrier chrominance signal is made constant in the ACC circuit 16, and an output of the ACC circuit 16 is supplied to a limiter 17 wherein an unwanted amplitude fluctuation component is eliminated. For example, an output carrier chrominance signal of the limiter 17 is successively supplied to a frequency count-down circuit 18 comprising two flip-flops which are connected in series. The frequency count-down circuit 18 counts down the frequency by ¼. Accordingly, by this frequency count-down, a carrier chrominance signal which is frequency-converted into a low frequency range is obtained from the frequency count-down circuit 18. This carrier chrominance signal which is frequency-converted into the low frequency range (hereinafter simply referred to as a low-band converted carrier chrominance signal), has a center frequency of approximately 1.1 MHz which is ¼ the center frequency of the input carrier chrominance signal, and has a frequency deviation width of 1.1 MHz±125 kHz which is ¼ the frequency deviation width of the input carrier chrominance signal. This low-band converted carrier chrominance signal, is eliminated of its unwanted component in a lowpass filter 19 which has a cutoff frequency of 1.7 MHz. An output of the lowpass filter 19 is supplied to an equalizer circuit 20. The equalizer circuit 20 gives the low-band converted carrier chrominance signal a frequency characteristic shown in FIG. 5A.

Figure 4A:
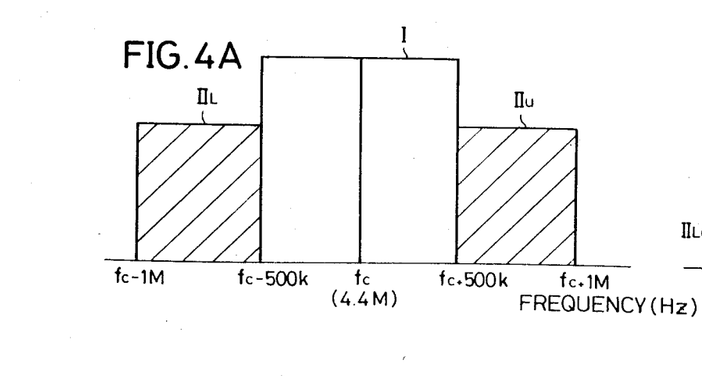
FIGS. 4A and 4B respectively show frequency spectrums of an input signal and an output signal of a countdown circuit in the block system shown in FIG. 3.
Figure 4B:
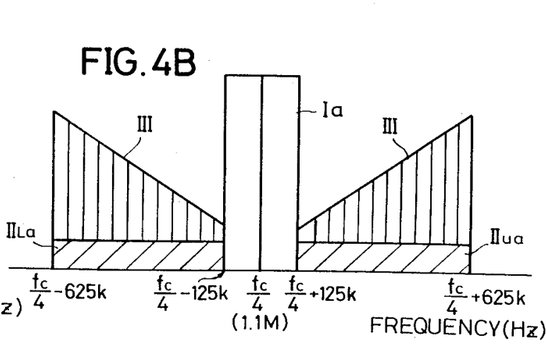

The frequency spectrum of the input carrier chrominance signal of the frequency count-down circuit 18, is shown in FIG. 4A. The frequency spectrum comprises a frequency deviation band I (4.4 MHz±500 kHz) with a center frequency $f_c$, and upper and lower sidebands $II_U$ and $II_L$. The level in the sidebands $II_U$ and $II_L$ is relatively high. The frequency spectrum of the low-band converted carrier chrominance signal which is produced from the frequency count-down circuit 18, is shown in FIG. 4B. As shown in FIG. 4B, the bandwidth of a frequency deviation $I_a$ is 1.1 MHz±125 kHz which is ¼ the frequency deviation band of the signal before being subjected to the frequency count-down, however, the level remain substantially unchanged. On the other hand, upper and lower sidebands $II_{Ua}$ and $II_{La}$ which are indicated by oblique hatchings are also reduced, and the level in the upper and lower sidebands $II_{Ua}$ and $II_{La}$ is reduced to substantially ¼. Hence, because the frequency deviation band is reduced to ¼ by the frequency count-down, a color inversion phenomenon will not occur even in a recording and reproducing apparatus which has a relatively narrow band.

Since the level in the upper and lower sidebands is reduced to substantially ¼ by the frequency count-down described above, the S/N ratio upon recording will become deteriorated if this low-band converted carrier chrominance signal is recorded. Thus, the equalizer circuit 20 is designed to give the low-band converted carrier chrominance signal from the lowpass filter 19, a characteristic shown in FIG. 5A, so as to amplify the level in the upper and lower sidebands III as indicated by vertical hatchings in FIG. 4B. This output low-band converted carrier chrominance signal of the equalizer circuit 20, which is amplified of its level in the upper and lower sidebands, is supplied to a mixer 21. The S/N ratio upon recording is improved by this level amplification in the upper and lower sidebands of the low-band converted carrier chrominance signal. The mixer 21 mixes a signal from an oscillator 22 having a single frequency in the range of 10 MHz, for example, as a high-frequency biasing signal, to the low-band converted carrier chrominance signal from the equalizer circuit 20. A mixed output signal of the mixer 21, is supplies to a first pair of head gaps $GC_1$ and $GC_2$.

Next, description will be given with respect to arrangements of the head gaps $GY_1$, $GY_2$, $GC_1$, and $GC_2$, by referring to FIGS. 3 through 6. In FIGS. 3 through 6, the first pair of head gaps $GC_1$ and $GC_2$ are fixed at diametrical positions on a rotary drum 23, on a rotational plane of the rotary drum 23. The second pair of head gaps $GY_1$ and $GY_2$ are fixed at diametrical positions on the rotary drum 23 on the same rotational plane, and the head gaps $GY_1$ and $GY_2$ are respectively separated by a predetermined distance from the head gaps $GC_1$ and $GC_2$ in a direction opposite to a rotating direction C of the rotary drum 23. This predetermined distance corresponds to a length of the magnetic tape which is required to record a signal related to two horizontal scanning periods, for example.

The rotary drum 23 forms a guide drum together with a stationary drum 24. The magnetic tape T is guided by guide poles 25 and 26, and is spirally wrapped around the peripheral surface of the guide drum over an angular range of approximately 180°. The magnetic tape T is driven by a capstan (not shown) in a state where the magnetic tape T is pinched between the capstan and a pinch roller (not shown). During a recording mode and a normal reproduction mode, the magnetic tape T travels in the direction of an arrow A. In addition, the rotary drum 23 is rotated in the direction of the arrow C by a motor 27. If it is assumed that a video signal which is to be recorded has a field frequency F (Hz), for example, the rotary drum 23 is rotated at a speed of F/2 rps. In this case, since the description is being given with respect to the recording of the SECAM system color video signal, the field frequency F is equal to 50 Hz and the rotational speed of the rotary drum 23 is 25 rps.

Figure 7:
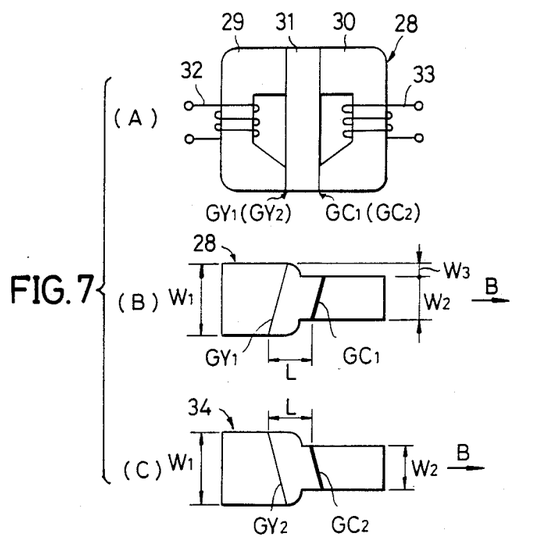
FIGS. 7(A) through 7(C) are a front view and bottom views respectively showing an embodiment of a head assembly which is employed in the system according to the present invention.

The head gaps $GC_1$ and $GY_1$, and the head gaps $GC_2$ and $GY_2$, are respectively provided in a single head assembly as shown in FIGS. 7(A) through 7(C), and has the so-called double-gap head design. As shown in FIG. 7(A), a head assembly 28 comprises a first core member 29 and a second core member 30 which confront each other with a common core 31 disposed therebetween. The head gaps $GY_1$ and $GC_1$ (or the head gaps $GY_2$ and $GC_2$) are respectively formed where the first and second core members 29 and 30 meet the common core 31. Coils 32 and 33 are respectively wound around the first and second core members 29 and 30. FIG. 7(B) shows a bottom view of the head assembly 28. A track width $W_1$ of the head gap $GY_1$ in the head assembly 28, is in the order of 24 μm which is equal to the track pitch, for example. A track width $W_2$ of the head gap $GC_1$ in the head assembly 28, is in the order of approximately 14 μm. The head assembly 28 is designed so that a center line along a scanning direction B of the head gap $GY_1$ with respect to the track width, and a center line along the scanning direction B of the head gap $GC_1$ with respect to the track width, respectively coincide. Accordingly, as shown in FIG. 7(B), the track width $W_1$ of the head gap $GY_1$ is wider than the track width $W_2$ of the head gap $GC_1$ by a width $W_3$ on both sides of the track width $W_2$, that is, by a width $2W_3$.

Figure 6:
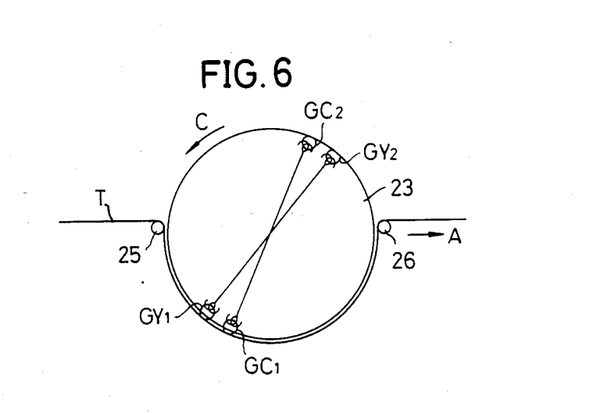
FIG. 6 is a plan view showing an embodiment of an arrangement of head gaps in the system according to the present invention.

FIG. 7(C) shows a bottom view of a head assembly 34. This head assembly 34 is designed similarly as the head assembly 28 which comprises the head gaps $GY_1$ and $GC_1$. The head assembly 34 comprises the head gaps $GY_2$ and $GC_2$. As shown in FIG. 6, the head assemblies 28 and 34 are mounted on the rotary drum 23 with an angular interval of 180°. The head gaps $GY_1$ and $GC_1$ are formed with the same azimuth angle as shown in FIG. 7(B), and the head gaps $GY_2$ and $GC_2$ are formed with the same azimuth angle as shown in FIG. 7(C). The head gaps $GY_1$ and $GY_2$ are formed with mutually different azimuth angles. Further, a spacing L between the head gaps $GY_1$ and $GC_1$ and a spacing L between the head gaps $GY_2$ and $GC_2$ are respectively selected to a value which corresponds to the length of the magnetic tape which is required to record the signal related to two horizontal scanning periods.

The gap widths of the head gaps $GC_1$ and $GC_2$ are respectively selected to relatively large values, to suit the head gaps $GC_1$ and $GC_2$ for recording and reproducing the low-band converted carrier chrominance signal which is in the low frequency range. On the other hand, the gap widths of the head gaps $GY_1$ and $GY_2$ are respectively selected to small values, to suit the head gaps $GY_1$ and $GY_2$ for recording and reproducing the frequency modulated luminance signal which is in the high frequency range.

The azimuth angles of the head gaps $GY_1$ and $GC_1$ which form the head assembly 28, are respectively selected to a value (+6°, for example) which is the same as the azimuth angle of one of the rotary heads in an existing 2-head helical scan type video tape recorder. Further, the azimuth angles of the head gaps $GY_2$ and $GC_2$ which form the head assembly 34, are respectively selected to a value (−6°, for example) which is the same as the azimuth angle of the other of the rotary heads in the existing video tape recorder. Thus, the magnetic tape which is recorded with the SECAM system color video signal by the system according to the present invention, can be reproduced in the existing video tape recorder which is designed in conformance with the SECAM system standard, and vice versa.

In other words, magnetic tape compatibility exists, if the recorded color video signal is the SECAM system color video signal.

Figure 8:
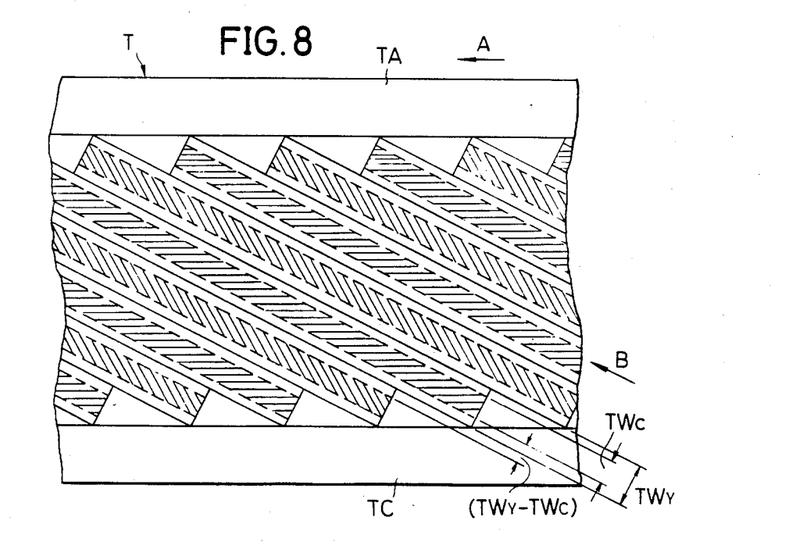
FIG. 8 shows a tape pattern on a magnetic tape onto which signals are recorded and from which signals are reproduced by the recording and reproducing system according to the present invention.

FIG. 8 shows an example of a tape pattern which is formed on the magnetic tape, by the system according to the present invention. In FIG. 8, an audio track TA is formed along the upper edge of the magnetic tape T, and a control track TC is formed along the lower edge of the magnetic tape T. Moreover, video tracks are formed obliquely to the longitudinal direction of the magnetic tape T, between the audio track TA and the control track TC, by the first pair of head gaps ($GC_1$ and $GC_2$) and the second pair of head gaps ($GY_1$ and $GY_2$). Each video track has a track width $TW_Y$. One video track includes a track indicated by the hatchings which is recorded with the low-band converted carrier chrominance signal and has a track width $TW_C$, and a track which is recorded with the frequency modulated luminance signal and has a track width $TW_Y$. The track which is recorded with the frequency modulated luminance signal, is recorded over the track which is recorded with the low-band converted carrier chrominance signal, by overlap recording. In the example shown in FIGS. 7(B) and 7(C), the track width $TW_Y$ is in the order of 24 μm, and the track width $TW_C$ is in the order of 14 μm. A signal corresponding to one field is recorded on one video track, and the track pitch is equal to $TW_Y$. As a result, no guard band is formed between the adjacent tracks which have the track width $TW_Y$ and are recorded with the frequency modulated luminance signal. On the other hand, a guard band is formed in essence between the adjacent tracks which have the track width $TW_C$ and are recorded with the low-band converted carrier chrominance signal. The adjacent tracks which have the track width $TW_C$ and are recorded with the low-band converted carrier chrominance signal, are respectively recorded with the head gaps $GC_1$ and $GC_2$ which have different azimuth angles. In FIG. 8, the directions of the oblique hatchings indicate the different azimuth angles of the head gaps $GC_1$ and $GC_2$ which form these tracks which are recorded with the low-band converted carrier chrominance signal.

Next, description will be given with respect to the overlap recording. An apparatus which was proposed in a Japanese Patent Application Publication No. 29913/1982 in which the applicant is the same as the assignee of the present application, may be employed to carry out the overlap recording. As described before, the first pair of head gaps ($GC_1$ and $GC_2$) are provided at positions respectively leading the second pair of head gaps ($GY_1$ and $GY_2$) in the rotating direction of the rotary drum 23. Hence, the head gap $GC_1$ (or $GC_2$) first slides over the magnetic tape T in the direction of the arrow B in FIG. 8, to record the low-band converted carrier chrominance signal onto a first track which has the track width $TW_C$ on the magnetic tape T. The low-band converted carrier chrominance signal is recorded at a most suitable recording level. Then, with a time lag of two horizontal scanning periods, the head gap $GY_1$ (or $GY_2$) which has the same azimuth angle as the leading head gap $GC_1$ (or $GC_2$) scans over the first track and records the frequency modulated luminance signal on a second track which includes the full width of the first track. That is, the second track is formed over the first track, in an overlapping manner. The track width $TW_Y$ of this second track includes the full width $TW_C$ of the first track.

In this state, the low-band converted carrier chrominance signal is mainly recorded at a relatively deep portion of the magnetic layer on the magnetic tape T, because the low-band converted carrier chrominance signal is in the low frequency range. When the frequency modulated luminance signal is recorded on top of this magnetic tape T which is recorded with the low-band converted carrier chrominance signal, the frequency modulated luminance signal is mainly recorded at a relatively shallow portion of the magnetic layer on the magnetic tape since the frequency modulated luminance signal is in the high frequency range and the wavelength of the frequency modulated luminance signal is short. The low-band converted carrier chrominance signal which is recorded at the relatively shallow portion of the magnetic layer is erased when the frequency modulated luminance signal is recorded in the overlapping manner. However, the low-band converted carrier chrominance signal which is recorded at the deep portion of the magnetic layer will not be erased and will remain virtually unchanged, even after the frequency modulated luminance signal is recorded in this overlapping manner. Thus, the video tracks shown in FIG. 8 are formed, by carrying out the recording of the low-band converted carrier chrominance signal and the recording of the frequency modulated luminance signal with a specific time difference. Each of the video tracks which are formed, includes the first track which has the track width $TW_C$ and has the low-band converted carrier chrominance signal recorded at the deep portion of the magnetic layer on the magnetic tape T, and the second track which has the track width $TW_Y$ and has the frequency modulated luminance signal recorded at the shallow portion of the magnetic layer on the magnetic tape T. In other words, the track recorded with the low-band converted carrier chrominance signal and the track recorded with the frequency modulated luminance signal coexist in one video track.

The second tracks which respectively have the track width $TW_Y$ and are recorded with the frequency modulated luminance signal, are formed in contiguous contact without a guard band between the adjacent second tracks. Further, the adjacent second tracks are respectively recorded by the head gaps $GY_1$ and $GY_2$ which have mutually difference azimuth angles. Thus, compared to the conventional apparatus which forms a guard band between the adjacent tracks, the tape utilization efficiency is improved according to the present invention. In addition, a track part which has a width ($TW_Y - TW_C$) and is recorded with the frequency modulated luminance signal which will provide a large azimuth loss, is disposed between the adjacent first tracks which is recorded with the low-band converted carrier chrominance signal. This track part which has the width ($TW_Y - TW_C$), may essentially be considered as a guard band according to the azimuth recording system. Accordingly, it is possible to eliminate the crosstalk due to the low-band converted carrier chrominance signal recorded in the adjacent tracks, when reproducing the first track. Although dependent on the precision of a servo circuit which controls the motor 27, the guard band must generally have a width which is at least in the range of 30% to 40% of the track pitch in order to effectively eliminate the crosstalk. The width ($TW_Y - TW_C$) of the track part which essentially acts as the guard band, is selected approximately equal to 10 $\mu$m with respect to the track pitch which is 24 $\mu$m in the examples shown in FIGS. 7(A) through 7(C).

Figure 9:
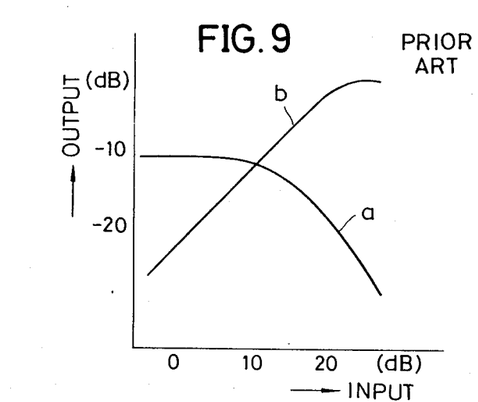
FIG. 9 is a graph showing an output level characteristic of reproduced signals which are obtained, upon reproduction of two signals which have different frequencies and were recorded simultaneously.

According to the conventional method of recording the color video signal, a signal of 5 MHz which is in the band of the frequency modulated luminance signal and a signal of 688 kHz which is in the band of the low-band converted carrier chrominance signal, are respectively multiplexed upon recording so that the signal of 5 MHz is maintained constant at a most suitable level when being multiplexed with the signal of 688 kHz which is gradually increased of its level as indicated by the horizontal axis in FIG. 9. When reproducing the multiplexed signal, a reproduced output level at 5 MHz becomes as indicated by a curve a in FIG. 9, and a reproduced output level at 688 kHz becomes as indicated by a curve b. That is, at the level where the reproduced output at 688 kHz saturates, the reproduced output level at 5 MHz decreases by over 10 dB. Accordingly, as clearly seen from FIG. 9, in order to simultaneously record the frequency modulated luminance signal and the low-band converted carrier chrominance signal by multiplexing these signals so that the reproduced output level of the frequency modulated luminance signal becomes maximum, it is only possible to utilize up to a level which is lower by over 10 dB than the most suitable level at which the maximum output of the low-band converted carrier chrominance signal can be obtained.

On the other hand, when the low-band converted carrier chrominance signal and the frequency modulated luminance signal are recorded with a specific time difference by the overlap recording method as in the present invention, the reproduced output level of the low-band converted carrier chrominance signal can be improved by approximately 6 dB without deteriorating the reproduced output level of the frequency modulated luminance signal, when compared to the reproduced output level of the low-band converted carrier chrominance signal which is obtained according to the conventional method described above. The effect of improving the S/N ratio of the reproduced low-band converted carrier chrominance signal by employing the overlap recording method, is quite large. Therefore, the deterioration in the S/N ratio of the reproduced low-band converted carrier chrominance signal, which is caused by the relatively narrow track width $TW_C$ of the first track as compared to the track width $TW_Y$ of the second track so as to essentially form the guard band, is fully and sufficiently compensated by employing the overlap recording method.

Figure 5B:
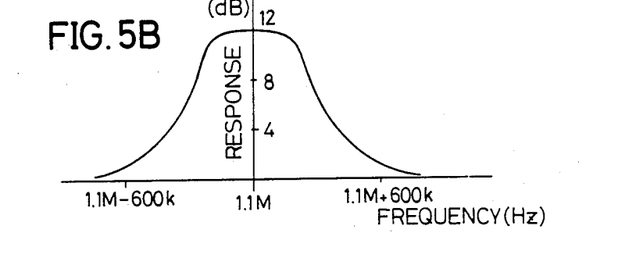
Figure 10:
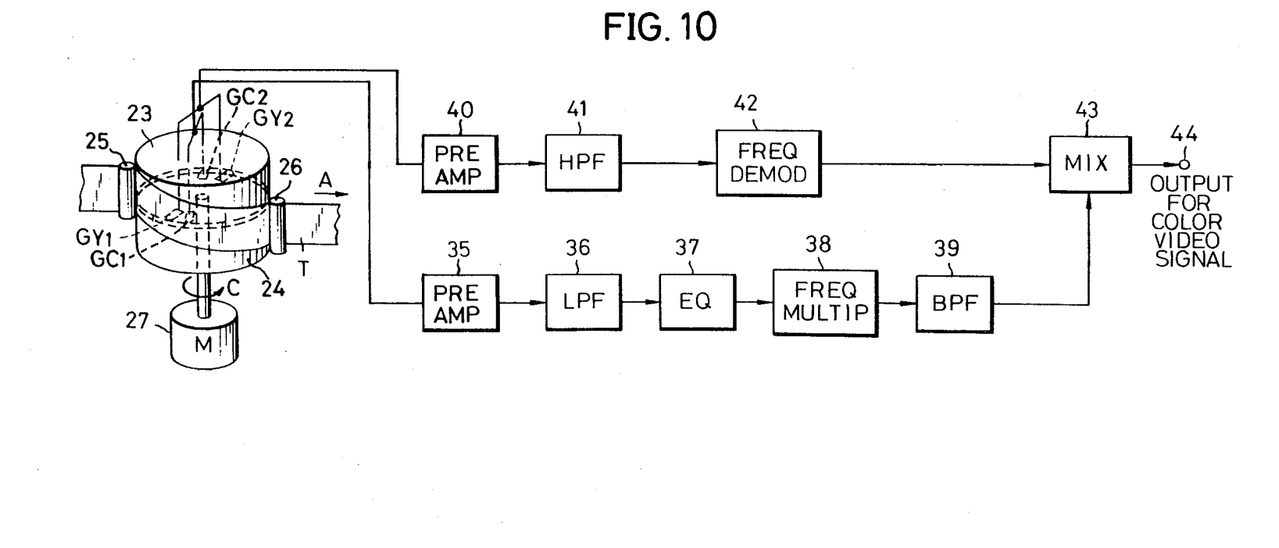
FIG. 10 is a systematic block diagram showing an embodiment of a reproducing system in the system according to the present invention.

Next, description will be given with respect to an embodiment of a reproducing system of the system according to the present invention, which reproduces the signals which are recorded on the magnetic tape T as described heretofore, by referring to FIG. 10. In FIG. 10, those parts which are the same as those corresponding parts in FIG. 3 are designated by the same reference numerals, and their description will be omitted. In FIG. 10, the signals which are recorded on the magnetic tape T with the tape pattern shown in FIG. 8, are respectively reproduced by the head gap $GC_1$ (or $GC_2$) and the head gap $GY_1$ (or $GY_2$) which scans two horizontal scanning periods after the head gap $GC_1$ (or $GC_2$). The signal which is reproduced by the head gap $GC_1$ (or $GC_2$) is amplified in a preamplifier 35, and then supplied to a lowpass filter 36 wherein the low-band converted carrier chrominance signal is filtered and separated. The reproduced low-band converted carrier chrominance signal having a center frequency of approximately 1.1 MHz, is supplied to an equalizer circuit 37. The equalizer circuit 27 gives the reproduced low-band converted carrier chrominance signal a frequency characteristic shown in FIG. 5B. This frequency characteristic shown in FIG. 5B is complementary to the characteristic shown in FIG. 5A. As a result, the level in the sidebands of the reproduced low-band converted carrier chrominance signal is made substantially constant. An output signal of the equalizer circuit 37 is supplied to a frequency multiplying circuit 38. The frequency multiplying circuit 38 is made up from a circuit which comprises a half-wave rectifying circuit and a bandpass filter and obtains a quadrupled frequency output by extracting a fourth-order harmonic component in the half-wave rectified output, or is made up from a phase locked loop (PLL) and the like. As is well known, the frequency deviation is quadrupled by multiplying the center frequency of the input frequency modulated wave by four and also multiplying the instantaneous frequency by four, and the low-band converted carrier chrominance signal is restored into the original carrier chrominance signal.

A bandpass filter 39 eliminates the unwanted frequency component from the output signal of the frequency multiplying circuit 38. Accordingly, an output signal of the bandpass filter 39 is a SECAM system carrier chrominance signal in which the center frequency and the frequency deviation are both restored to the original center frequency and the original frequency deviation.

On the other hand, after a time lag of two horizontal scanning periods from the time when the head gap $GC_1$ (or $GC_2$) reproduced the recorded signal, the head gap $GY_1$ (or $GY_2$) reproduces the recorded signal from the same video track. The signal which is reproduced by the head gap $GY_1$ (or $GY_2$), is passed through a preamplifier 40, and then supplied to a highpass filter 41 wherein the frequency modulated luminance signal is filtered and separated. The reproduced frequency modulated luminance signal from the highpass filter 41, is frequency-demodulated in a frequency demodulator 42 and restored into a reproduced luminance signal in the original band. An output signal of the frequency demodulator 42 is supplied to a mixer 43, wherein the reproduced carrier chrominance signal and the reproduced luminance signal are mixed. As a result, a reproduced SECAM system color video signal is produced from the mixer 43, through an output terminal 44.

According to the present embodiment of the invention, the adjacent video tracks are respectively recorded and reproduced by head gaps which have mutually difference azimuth angles. Hence, as the head gap $GY_1$ (or $GY_2$) reproduces the second track which is recorded without a guard band formed between the adjacent second tracks, the frequency modulated luminance signal recorded in the adjacent second tracks will hardly mix into the reproduced signal as crosstalk, because the recorded frequency modulated luminance signal is in the high frequency range and the azimuth loss is large. In addition, the low-band converted carrier chrominance signal reproduced from the first track which is included within the second track which is being scanned, and the low-band converted carrier chrominance signal reproduced from the first tracks which are included in the second tracks adjacent to the second track which is being scanned, are respectively eliminated from the signal which is reproduced by the head gap $GY_1$ (or $GY_2$) in the highpass filter 41. Therefore, the luminance signal is reproduced with a high quality.

On the other hand, when the head gap $GC_1$ (or $GC_2$) reproduces the first track which has the track width $TW_C$, the low-band converted carrier chrominance signal recorded on the adjacent first tracks will not be reproduced as crosstalk. This is because the track part which is recorded with the frequency modulated luminance signal and has a width $2(TW_Y-TW_C)$, exists between two adjacent first tracks. Moreover, the frequency modulated luminance signal which is recorded on a track part which has a width $(TW_Y-TW_C)$ by the head gap $GY_2$ (or $GY_1$) which has an azimuth angle different from the azimuth angle of the head gap $GC_1$ (or $GC_2$), will hardly mix into the reproduced signal as crosstalk, since the azimuth loss is large. Furthermore, the frequency modulated luminance signal within the reproduced signal which is obtained as the head gap $GC_1$ (or $GC_2$) reproduces the first track and the second track which are recorded by a head gap which has the same azimuth angle as the head gap $GC_1$ (or $GC_2$), is eliminated in the lowpass filter 36. Accordingly, only the low-band converted carrier chrominance signal which is recorded on the first track which is scanned by the head gap $GC_1$ (or $GC_2$), is reproduced as a carrier chrominance signal which is in conformance with the SECAM system, with a high quality.

Therefore, even when scanning over the magnetic tape which has the tape pattern shown in FIG. 2 in which there is no H-alignment, no undesirable effect of crosstalk will be introduced. It is thus possible to obtain a SECAM system color video signal of high quality.

Although not illustrated in the recording system shown in FIG. 3, it is desirable to provide a clamping circuit between the output of the limiter 17 and the input of the frequency count-down circuit 18, so as to clamp the horizontal blanking period and the vertical blanking period with respect to the output of the limiter 17. Such an arrangement is desirable because the SECAM system carrier chrominance signal has parts where no color information is included. When such a clamping is carried out by forcibly fixing the level constant in the horizontal blanking period and the vertical blanking period, it becomes possible to prevent the noise in these periods from appearing on the reproduced picture as beat, and the S/N ratio is consequently improved.

The present invention is not limited to the embodiment described heretofore. For example, the reproduction may be carried out by use of the second pair of head gaps $GY_1$ and $GY_2$ alone. In this case, the reproduced signal from the head gaps $GY_1$ and $GY_2$ is passed through the preamplifier 40, and the output signal of the preamplifier 40 is supplied to the lowpass filter 36 on one hand and supplied to the highpass filter 41 on the other. In addition, the low-band converted carrier chrominance signal which is recorded by the head gap $GC_1$ (or $GC_2$) on the first track part which is within the video track being scanned, and the frequency modulated luminance signal which is recorded with a time lag of two horizontal scanning periods by the head gap $GY_1$ (or $GY_2$) which has the same azimuth angle as the head gap $GC_1$ (or $GC_2$) on the second track part which is within the video track being scanned, are respectively reproduced simultaneously in this case. However, in the SECAM system color video signal, there is correlation among information for every interval of two horizontal scanning periods. As a result, it is possible to obtain a reproduced SECAM system color video signal which is acceptable from the practical point of view, even if the timing is not matched by use of a delay circuit.

On the other hand, a delay circuit for matching the timing, may be provided in the reproducing system. In this case, slight deterioration will result in the picture quality of the reproduced picture. However, it will be unnecessary to select the spacings of the head gaps $GY_1$ and $GC_1$ and the head gaps $GY_2$ and $GC_2$ to a value which is an integral multiple of the horizontal synchronizing period.

The system according to the present invention is not limited to the application in which the SECAM system color video signal is recorded and reproduced, and may also be applied to the recording and reproduction of an NTSC system color video signal and a PAL system color video signal. Conventionally, the NTSC system color video signal was recorded and reproduced as disclosed in a U.S. Pat. No. 4,178,606 in which the assignee is the same as the assignee of the present application, for example. According to this U.S. patent, the low-band converted carrier chrominance signal is recorded on one of the two adjacent tracks by shifting the phase of a chrominance subcarrier by 90° in a certain direction, for every one horizontal scanning period. The low-band converted carrier chrominance signal is recorded on the other of the two adjacent tracks by shifting the phase of the chrominance subcarrier by 90° in a direction opposite to the above certain direction, for every one horizontal scanning period. Upon reproduction, the phase is shifted for every one horizontal scanning period in directions so as to cancel the shifted phase of the chrominance subcarrier in the low-band converted carrier chrominance signal which is reproduced. The low-band converted carrier chrominance signal reproduced from the adjacent tracks as crosstalk, is eliminated from the reproduced low-band converted carrier chrominance signal in which the phase shift of the chrominance subcarrier has been cancelled, in a comb filter which comprises a delay circuit having a delay time of one horizontal scanning period. Similarly, when recording the PAL system color video signal, a circuit was conventionally required for taking countermeasures against the crosstalk, so as to record the low-band converted carrier chrominance signal in which the chrominance subcarrier is phase-shifted on one of the two adjacent tracks.

However, according to the system of the present invention, it is unnecessary to provide the circuits for shifting the phase of the chrominance subcarrier in the low-band converted carrier chrominance signal, and the comb filter described above. Hence, compared to the conventional circuit, the circuit construction is simplified and the cost of the circuit is reduced according to the present invention.

The track width $TW_Y$ of the head gaps $GY_1$ and $GY_2$ may be larger than the track pitch. In such a case, a part of a pre-recorded second track will be erased as a subsequent adjacent second track is formed, because a part of this subsequent adjacent track will slightly overlap a part of this pre-recorded second track. When obtaining the tape pattern shown in FIG. 8 by use of the head gaps $GY_1$ and $GY_2$ having the track width $TW_Y$ which is larger than the track pitch, the center line of the the first pair of head gaps $GC_1$ and $GC_2$ along the scanning direction, must be shifted leftwards with respect to the scanning direction from the center line of the second pair of head gaps $GY_1$ and $GY_2$ by a distance $(TW_Y - TP)/2$, where TP represents the track pitch. Such a shift is necessary because, among the pre-recorded second track which is recorded by the head gap $GY_1$ (or $GY_2$) and has the track width $TW_Y$, a right edge part of this pre-recorded second track which amounts to a width of $TW_Y - TP$ is erased as a subsequent adjacent second track is formed. In this case, the noise bar will be reduced when carrying out a special reproduction in which the reproduction is performed with a tape speed different from the tape speed upon recording, and the use of the head gaps $GY_1$ and $GY_2$ having the track width $TW_Y$ which is larger than the track pitch is preferred from this point of view.

Figure 11:
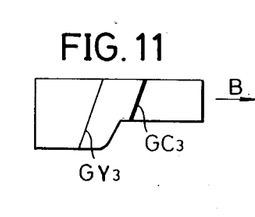
FIG. 11 is a bottom view showing another embodiment of a head assembly which is employed in the system according to the present invention.

The center line of the first track along the scanning direction, and the center line of the second track along the scanning direction, need not coincide as illustrated in FIG. 8. The condition which needs to be satisfied, is that at least the full width of the first track is included within the track width of the second track. Accordingly, the head assembly may be designed so that one edge along the track width direction of a head gap $GC_3$ which records and reproduces the low-band converted carrier chrominance signal, and one edge along the track width direction of a head gap $GY_3$ which records and reproduces the frequency modulated luminance signal, are aligned on the same line along the scanning direction as shown in FIG. 11. This head assembly shown in FIG. 11 can be manufactured with ease, compared to the head assemblies 28 and 34 shown in FIGS. 7(A) through 7(C).

In addition, in the recording system described before, the high-frequency output signal of the oscillator 22 is recorded as the biasing signal. However, the output signal of the highpass filter 15 may be used as the high-frequency biasing signal, by multiplexing the output signal of the highpass filter 15 with the low-band converted carrier chrominance signal. Moreover, since the SECAM system carrier chrominance signal is a frequency modulated wave, the low-band converted carrier chrominance signal may be directly recorded on the magnetic tape T without multiplexing the biasing signal.

Further, the present invention is not limited to these embodiments, but various variations and modifications may be made without departing from the scope of the present invention.

What is claimed is:

1. A color video signal recording system comprising:
   separating means for separating a luminance signal and a carrier chrominance signal from an input color video signal;
   frequency modulating means for frequency-modulating a carrier by the luminance signal which is separated in said separating means, and for producing a frequency modulated luminance signal;
   frequency converting means for frequency-converting the carrier chrominance signal which is separated in said separating means into a frequency range which is lower than a band occupied by said frequency modulated luminance signal, and for producing a low-band converted carrier chrominance signal;
   a first pair of head gaps mounted on a rotary body in a rotational plane of said rotary body, said first pair of head gaps having mutually different azimuth angles, each of said first pair of head gaps having a first track width;
   a second pair of head gaps mounted on said rotary body in the same rotational plane of said rotary body, said second pair of head gaps having mutually different azimuth angles but respectively having the same azimuth angles as the first pair of head gaps, each of said second pair of head gaps being mounted at locations lagging each of said first pair of head gaps by a predetermined distance along a rotating direction of said rotary body, each of said second pair of head gaps having a second track width which is larger than said first track width, a pair of head assemblies being respectively formed by two head gaps of the same azimuth angle amoung the first and second pairs of head gaps, said pair of head assemblies being mounted diametrically on said rotary body; and
   recording means for carrying out recording with respect to a recording medium which is caused to travel in a state where said recording medium is wrapped around a peripheral surface of said rotary body,
   said recording means first recording said low-band converted carrier chrominance signal from said frequency converting means on a first track by one of said first pair of head gaps and thereafter recording said frequency modulated luminance signal from said frequency modulating means on a second track by one of said second pair of head gaps,
   said second track having a track width which is larger than a track width of said first track and being formed over said first track is an overlapping manner with a track pitch which is at least larger than the track width of said first track,
   said second track width of said second pair of head gaps being selected to a value which is equal to or larger than said track pitch,
   said predetermined distance being selected equal to a length of said recording medium which is required to record a signal corresponding to an integral multiple of a horizontal scanning period.

2. A color video signal recording system as claimed in claim 1 which further comprises means for mixing an oscillation output signal of an oscillator to said low-band converted carrier chrominance signal from said frequency converting means, as a high-frequency biasing signal, and for supplying a resulting mixed signal to said first plurality of head gaps as a recording signal.

3. A color video signal recording system as claimed in claim 1 which further comprises means for multiplexing said frequency modulated luminance signal from said frequency modulating means with said low-band converted carrier chrominance signal from said frequency converting means, as a high-frequency biasing signal, and for supplying a resulting multiplexed signal to said first pair of head gaps as a recording signal.

4. A color video signal recording system as claimed in claim 1 in which said input color video signal is a SECAM system color video signal, and said low-band converted carrier chrominance signal from said frequency converting means is directly supplied to said first pair of head gaps without being mixed or multiplexed with a high-frequency biasing signal.

5. A color video signal recording and reproducing system comprising:

first separating means for separating a luminance signal and a carrier chrominance signal from an input color video signal;

frequency modulating means for frequency-modulating a carrier by the luminance signal which is separated in said first separating means, and for producing a freqeuncy modulated luminance signal;

first frequency converting means for frequency-converting the carrier chrominance signal which is separated in said first separating means into a frequency range which is lower than a band occupied by said frequency modulated luminance signal, and for producing a low-band converted carrier chrominance signal;

second frequency converting means for frequency-converting a low-band converted carrier chrominance signal which is separated from reproduced signal into an original frequency range of the carrier chrominance signal;

demodulating means for demodulating a frequency modulated luminance signal which is separated from the reproduced signal;

mixing means for mixing an output carrier chrominance signal of said second frequency converting means and an output luminance signal of said demodulating means to obtain a reproduced color video signal;

a first pair of head gaps mounted on a rotary body in a rotational plane of said rotary body, said first pair of head gaps having mutually different azimuth angles, each of said first plurality of head gaps having a first track width;

a second pair of head gaps mounted on said rotary body in the same rotational plane of said rotary body, said second pair of head gaps having mutually different azimuth angles but respectively having the same azimuth angles as the first pair of head gaps, each of said second plurality of head gaps being mounted at locations lagging each of said first plurality of head gaps by a predetermined distance along a rotating direction of said rotary body, each of said second plurality of head gaps having a second track width which is larger than said first track width, a pair of head assemblies being respectively formed by two head gaps of the same azimuth angle amoung the first and second pairs of head gaps, said pair of head assemblies being mounted diametrically on said rotary body;

recording means for carrying out recording with respect to a recording medium which is caused to travel in a state where said recording medium is wrapped around a peripheral surface of said rotary body, said recording means first recording said low-band converted carrier chrominance signal from said first frequency converting means on a first track by one of said first pair of head gaps and thereafter recording said frequency modulated luminance signal from said frequency modulating means on a second track by one of said second pair of head gaps, said second track having a track width which is larger than a track width of said first track and being formed over said first track in an overlapping manner with a track pitch which is at least larger than the track width of said first track said second track width of said second pair of head gaps being selected to a value which is equal to or larger than said track pitch;

second separating means for separating said low-band converted carrier chrominance signal from a signal which is reproduced from said recording medium by said first or second pair of head gaps; and third separating means for separating said freqeuncy modulated luminance signal from a signal which is reproduced from said recording medium by said second pair of head gaps, said second frequency converter frequency-converting said low-band converted carrier chrominance signal seperated in said second separating means;

said demodulating means demodulating said frequency modulated luminance signal separated in said third separating means, said predetermined distance being selected equal to a length of said recording medium which is required to record a signal corresponding to an integral multiple of a horizontal scanning period.

6. A color video signal recording and reproducing system as claimed in claim 5 in which only the signals reproduced by said second pair of head gaps are supplied to said second and third separating means, and said first pair of head gaps are unused during reproduction.

* * * * *